(12) United States Patent
Bertram et al.

(10) Patent No.: US 6,974,025 B2
(45) Date of Patent: *Dec. 13, 2005

(54) FOAM IN BAG PACKAGING SYSTEM AND METHOD FOR PRODUCING THE SAME

(75) Inventors: George T. Bertram, Newton, CT (US); William R. Armstrong, Newton, CT (US); Lawrence J. Pillote, Southbury, CT (US); William J. Mahon, Southbury, CT (US); Robert D. Wheeler, Fairfield, CT (US); Laurence B. Sperry, Brighton, MA (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/771,616

(22) Filed: Feb. 4, 2004

(65) Prior Publication Data

US 2004/0209026 A1  Oct. 21, 2004

Related U.S. Application Data

(63) Continuation of application No. 09/914,824, filed as application No. PCT/US99/05724 on Mar. 12, 1999, now Pat. No. 6,712,201.

(60) Provisional application No. 60/077,962, filed on Mar. 13, 1998.

(51) Int. Cl.[7] .......................... B65D 81/05; B65D 81/32
(52) U.S. Cl. ...................................... 206/219; 206/524
(58) Field of Search ............................... 206/219–222, 206/459.5, 524, 568, 523; 383/38–40

(56) References Cited

U.S. PATENT DOCUMENTS 3,419,134 A   12/1968 Fitts
4,800,708 A   1/1989 Sperry
4,854,109 A   8/1989 Pinarer et al.

(Continued)

FOREIGN PATENT DOCUMENTS

BE    894 727    2/1983

(Continued)

Primary Examiner—Jim Foster
(74) Attorney, Agent, or Firm—Daniel B. Ruble

(57) ABSTRACT

A packaging system for producing a foam-in-bag cushion upon demand includes a bag of flexible plastic film and defining therein an enclosed space which is vented to the outside of the bag, a foam precursor packet positioned at a predetermined location within the enclosed space in the bag and being formed of a barrier material. The packet includes first and second compartments with a first frangible seal separating the first and second compartments which when ruptured will permit the contents of the compartments to be mixed to form a foam cushion and a second frangible seal between one of the compartments and the enclosed space in the bag. A first foam precursor component is contained in the first compartment of the packet and a second foam precursor component is contained in the second compartment of the packet. The frangible seals have a peel strength of at least about one pound per inch and less than about twelve pounds per inch and more particularly a peel strength of about one pound per inch to about seven pounds per inch. The frangible seals are formed by providing bands of printed area on the facing surfaces of the material forming the packet which is arranged in a matrix of printed and unprinted areas. The printed areas prevent the surfaces from being joined by heat sealing and the matrix is such that a frangible seal of the desired peel strength is formed.

2 Claims, 6 Drawing Sheets

U.S. PATENT DOCUMENTS

| | | |
|---|---|---|
| 4,889,234 A | 12/1989 | Sorensen et al. |
| 4,938,007 A | 7/1990 | Sperry |
| 5,027,583 A | 7/1991 | Chelak |
| 5,139,151 A | 8/1992 | Chelak |
| 5,287,981 A | 2/1994 | Herran |
| 5,376,219 A | 12/1994 | Sperry et al. |
| 5,699,902 A | 12/1997 | Sperry et al. |
| 5,899,325 A | 5/1999 | Bertram et al. |
| 5,996,782 A | 12/1999 | Sperry et al. |
| 6,149,655 A | 11/2000 | Constantz et al. |
| 6,245,176 B1 | 6/2001 | Greenland |
| 6,272,813 B1 | 8/2001 | Sperry et al. |
| 6,712,201 B1 * | 3/2004 | Bertram et al. ............. 206/219 |

FOREIGN PATENT DOCUMENTS

| | | |
|---|---|---|
| WO | 98/46407 | 10/1998 |
| WO | 98/46408 | 10/1998 |
| WO | 99/46498 | 9/1999 |

* cited by examiner

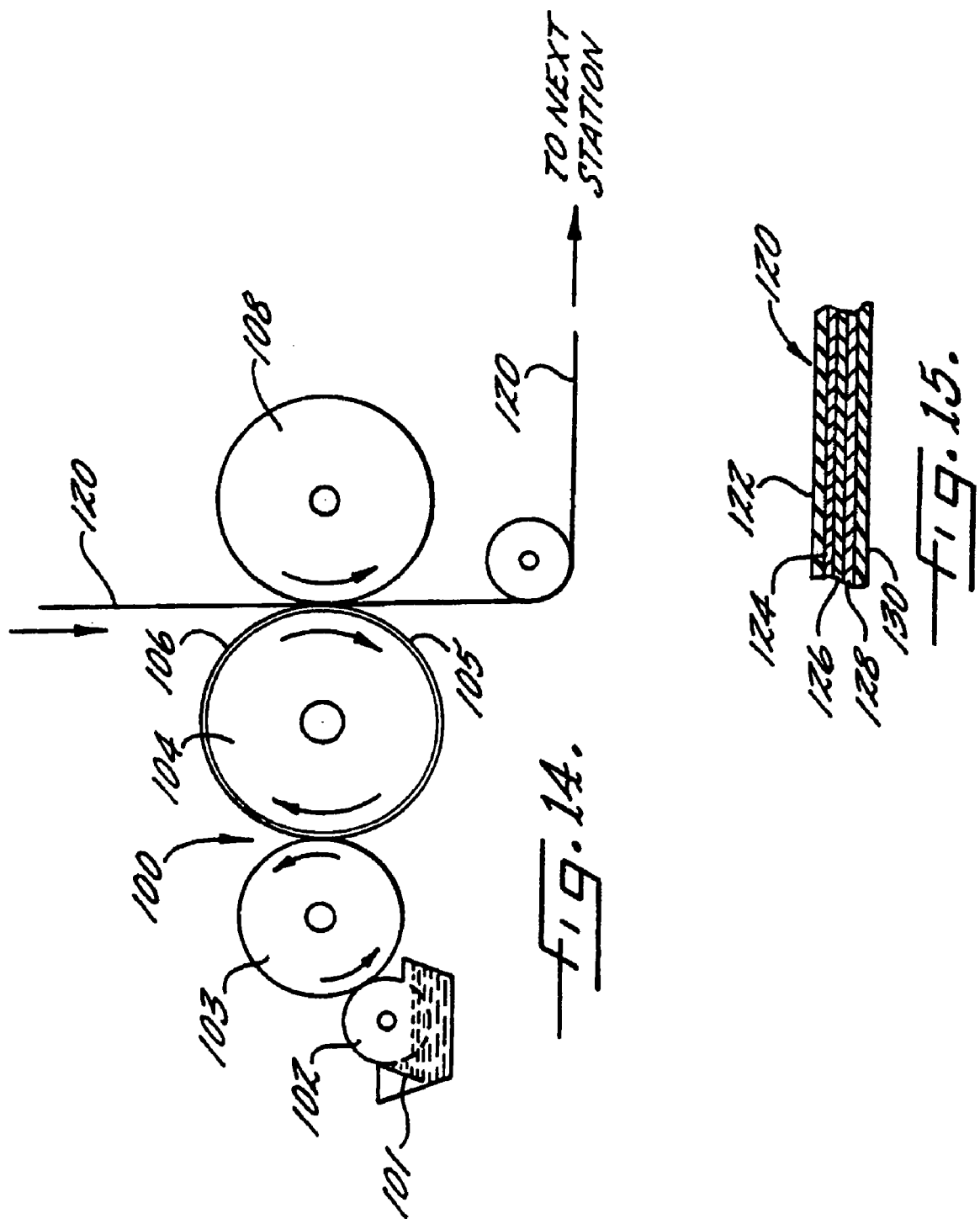

FOAM IN BAG PACKAGING SYSTEM AND METHOD FOR PRODUCING THE SAME

This application is a continuation application under 35 U.S.C. §120 of pending prior U.S. Pat. Application Ser. No. 09/914,824 filed May 14, 2002 by Bertram et al for "Foam in Bag Packaging System and Method for Producing the Same" (parent application), now U.S. Pat. No.6,712,201 which is the National Stage (35 U.S.C. §371) of International Application No. PCT/U.S.99/05724 filed Mar. 12, 1999, which claims the benefit of U.S. Provisional Application No. 60/077,962 filed Mar. 13, 1998. Each of the applications listed in the previous sentence is incorporated herein in its entirety by reference.

FIELD OF THE INVENTION

The present invention relates to foam-in-place packaging of articles susceptible to damage during handling, shipment and storage and in particular, relates to foam-in-bag packaging systems which will produce foam cushions upon demand and a method of producing the same.

BACKGROUND OF THE INVENTION

The packaging of fragile articles or articles susceptible to damage during such packaging, shipment and storage presents many distinct problems. Foam-in-place packaging has been well known and widely used as protective packaging for such articles for a number of years. Foam-in-place technology is based upon the reaction between two (usually liquid) precursor components, which when mixed will react to form a polymer foam and gaseous by-products. In particular, and most commonly, an isocyanate containing component is mixed with a polyol containing component and these components react to produce a urethane polymer (polyurethane), steam and carbon dioxide. Under proper conditions, the steam and carbon dioxide generated by the reaction will disburse through the polymer and form an expanded polyurethane foam that provides protective cushioning for articles being packaged. The reaction of the components, when mixed to form an expanded foam, takes a minute or two and this time frame makes it feasible to manipulate and use the foam for packaging purposes. Initially, the foam precursor components were injected into containers (e.g. corrugated boxes), and either a mold element was used to form an article receiving cavity as the foam expanded or the article wrapped in a protective material was itself placed in the container and the foam permitted to expand therearound. Such foam-in-place packaging has been very successful and is still widely used for certain packaging purposes. However, such foam-in-place packaging did not address or was not suited for many packaging purposes.

Accordingly, a next generation of foam-in-place packaging has been developed in which devices were provided which concurrently form plastic bags and inject into the bag the mixture of foam precursor components. This bag is provided with vents to the outside to permit the steam and carbon dioxide by-products to escape during the formation of the foam. Prior to the reaction of the components to produce foam, an operator places the newly made bag into a container in which an object has been placed and then closes the container. The precursors react to produce foam which fills the void areas within the container, while forming a custom shaped cushion around the object being packaged. Such foam-in-bag packaging technology has also been quite successful and is now in substantial use.

Examples of such foam-in-bag technology heretofore developed is shown and described in a number of patents commonly assigned with this application and including U.S. Pat. Nos. 4,800,708; 4,854,109; 4,938,007; 5,027,583; 5,139,151 and 5,376,219.

All of these devices are characterized by forming the bags and injecting the foam precursor components into the bags immediately prior to the reaction of the components and the production of foam in the bags. Therefore, these devices by necessity must be placed adjacent the packaging operation. Here again, these devices are not adaptable or usable in all packaging situations, although they have greatly expanded the use of foam-in-place packaging technology.

U.S. Pat. No. 5,699,902, also commonly assigned to the Assignee of this application, discloses a still further generation of foam-in-place packaging. This patent discloses a packaging system in which a bag is formed of flexible plastic film material defining an enclosed space therein and having separate interior cells in the enclosed space. The cells contain two different foam precursor components. The two cells containing the foam precursor components are separated by a frangible seal which maintains the precursor components separate until it is desired to use the bag. Once the packaging system is to be used, the frangible seal between the two cells is broken and the two precursor components are mixed.

There is also provided another frangible seal between the cells and the enclosed space within the bag. This second frangible seal is broken by the reaction of the two precursor components and the production of foam which expands out of the cells into the enclosed space in the bag until the interior of the bag is substantially filled and a foam cushion is formed. The interior of the bag is vented to the outside so that the gaseous by-products of the foaming reaction may escape from the bag. By this arrangement, a foam-in-bag packaging system has been provided in which bags could be produced at locations remote from the packaging operations, packaged in containers, shipped to the packaging operation locations and stored until desired for use. When desired for use, an appropriately sized bag is removed from its container, the first frangible seal between the two cells is broken and the chemicals mixed, and the second frangible seal is broken by the reaction and a foam cushion is formed in the enclosed space in the bag. Accordingly, a packaging system of greatly increased versatility and usability was thus provided. However, the production of reliable frangible seals which maintain the two components separate, but which may be readily fractured to permit mixing of the components has been the cause of concern and anxiety.

SUMMARY OF THE INVENTION

With the foregoing in mind, it is an object of the present invention to provide flexible packages having a unique frangible seal which maintains precursor components separate while being readily fracturable upon desired use of the package to provide mixing of the heretofore separated components.

The foregoing object of this invention is achieved by providing a bag formed of flexible plastic material which defines an interior enclosed space, which interior space is vented to the outside of the bag to permit gaseous by-products of the foaming reaction to escape. A packet or pouch having a plurality of compartments therein, separated from each other by at least one frangible seal and having another frangible seal between the compartments in the packet and the enclosed space within the bag, is provided within the bag. First and second foam precursor components are contained in the separate compartments within the packet and are maintained separated by the interior frangible seal. The packet is formed of a barrier material which is capable of maintaining the foam precursors in a substantially stable and unreacted state for the desired shelf life of the foam-in-bag packaging system.

A packaging system of this type is disclosed in the co-pending application, Ser. No. 09/042,444 filed Mar. 13, 1998 entitled "Foam In Bag Packaging System and Method For Producing the Same," which application is commonly assigned to the Assignee of this application and is incorporated herein by reference.

In accordance with a first preferred embodiment, the frangible seals of this invention, include a seal pattern which comprises one or more substantially continuous seal lines, each of which extend substantially between opposite sides of the packet to substantially divide the packet into a plurality of compartments. Each seal line is configured such that any imaginary straight line between the opposite sides of the packet and intersecting the seal line subtends at least one converging pocket defined by two segments of the seal lines which converge upon each other in the opening direction. Accordingly, the converging seal line segments are at oblique angles to the first direction. Preferably, this seal line defines a plurality of converging pockets which are spaced apart and extend substantially from one side of the compartment of the packet to the other. Thus, when the compartment is compressed, it causes liquid in the compartment to advance in the second direction, the leading edge or front of the liquid intersects a given seal line and liquid enters the wide end of each of the converging pockets and flows to the narrow end thereof. Fluid forces acting outwardly on the opposing panels which are joined along the converging seal line segments accordingly cause progressive peeling apart of the barrier material in the region of each converging pocket from the wide end toward the narrow end thereof.

By way of example and not by way of limitation, seal patterns in accordance with the first preferred embodiment of the invention include grids of spaced-apart intersecting seal lines in orthogonal or non-orthogonal fashion running oblique to the first direction and extending to each of the opposite sides of the packet, such that seal lines extending from one side to the other are defined by joined segments of the grid lines. Alternatively, the seal pattern may comprise wave form seal lines, such as saw-tooth or wavy lines extending from one side to the other. The converging pockets may take a variety of forms, including but not limited to triangular or V-shaped, cusp-shaped, U-shaped or other shapes.

In accordance with a second preferred embodiment of the invention, the seal pattern comprises a plurality of discrete sealed areas separated from one another by unsealed areas and arranged in a regular matrix having a density of at least about 15 matrix lines per inch, and more preferably at least about 50 matrix lines per inch.

A frangible seal in accordance with the invention may be formed by various techniques. In a preferred method, the opposing panels of barrier material have inner surfaces that are heat sealable to each other. One of the opposing regions of the inner surfaces that are to be joined to create the frangible seal is covered by a layer of resist material which prevents the heat sealing of the opposing surfaces to each other. The resist material is applied in a reverse image of the seal pattern. For example, to produce a square grid seal pattern, resist material is applied in a checker board pattern with the squares of resist material spaced apart such that the spaces between the squares define intersecting or orthogonal lines along which the panels of barrier material are to be joined.

The opposing panels of barrier material are overlayed with their inner surfaces confronting each other. The panels are pressed together and heat and pressure are then applied to the panels in a region of the resist material to cause heat sealing of the panels together in the areas not covered by the resist material.

The resist material may be applied by various techniques. In a preferred method, a resist material is printed onto the inner surface of one of the panels by a rotary printing press, such as a flexographic, roto-gravure or rotary letterbox press. Where the frangible seal is formed by a matrix of sealed areas, the seal advantageously is formed by printing resist material onto the inner surface of one of the panels by a half-tone printing process. The resist is applied with a half-tone dot line density of at least about 15 lines per inch and a surface coverage of at least about 60%.

The resist material may comprise a material having an acrylic/styrene resin-based vehicle, and other components, such as surfactants, alcohol, defoamers, and waxes may be added to the vehicle to improve adhesion, wetting out, and other properties of the resist for insuring accurate application of the resist pattern to the panel surface. A pigment may be added to the vehicle to facilitate visual inspection of the resist pattern. Also, solvent based inks, such as nitro-cellulose, polyamide type inks, may be used.

In accordance with one preferred embodiment of the invention, the inner surfaces of the panels are formed of a substantially non-polar polymer material which has not been treated by chemical modification, such as corona discharge treatment or flame treatment or by other treatments, to impair to any significant degree the strength of the non-frangible best seals. The panels are thus more readily heat sealable to each other so that sufficiently strong non-frangible seals may be achieved to form fluid-tight compartments in a packet. The invention also provides packets incorporating one or more frangible seals in accordance with the invention. In accordance with a preferred embodiment of the invention, a packet is provided having two compartments for containing two different components, the compartments being separated by a frangible seal according to the invention. Preferably, the packet also includes a second frangible seal between one of the compartments and the outside which, once the packet is placed in the bag, will comprise the interior space within the bag. Advantageously, the second frangible seal has a greater peel strength than the first frangible seal so that the second seal is not inadvertently ruptured when the user compresses one of the compartments to break the first seal, thus assuring that the two reactive fluids are brought into intimate contact within the package so that thorough mixing occurs before either fluid can escape the packet.

A further preferred embodiment of a packet for containing foam-forming precursors includes panels formed of a laminate having, from an outer layer to an inner layer thereof, an oriented polyethylene teraphthalate layer, a polyethylene tie layer, a metal foil layer, an ethylene acrylic acid layer and a non-polar polymer layer, such as low density polyethylene, linear low-density polyethylene, or the like.

BRIEF DESCRIPTION OF THE DRAWINGS

The above and other objects, features and advantages of the invention will become more apparent from the following description of certain preferred embodiments thereof, when taken in conjunction with the accompanying drawings in which.

FIG. 14 is a schematic view of a printing apparatus for applying a resist material to a web of barrier material for forming packets in accordance with this invention; and FIG. 15 is a fragmentary enlarged cross-sectional view taken substantially along line 15—15 in FIG. 4.

DETAILED DESCRIPTION OF PREFERRED EMBODIMENTS

Figure 1:
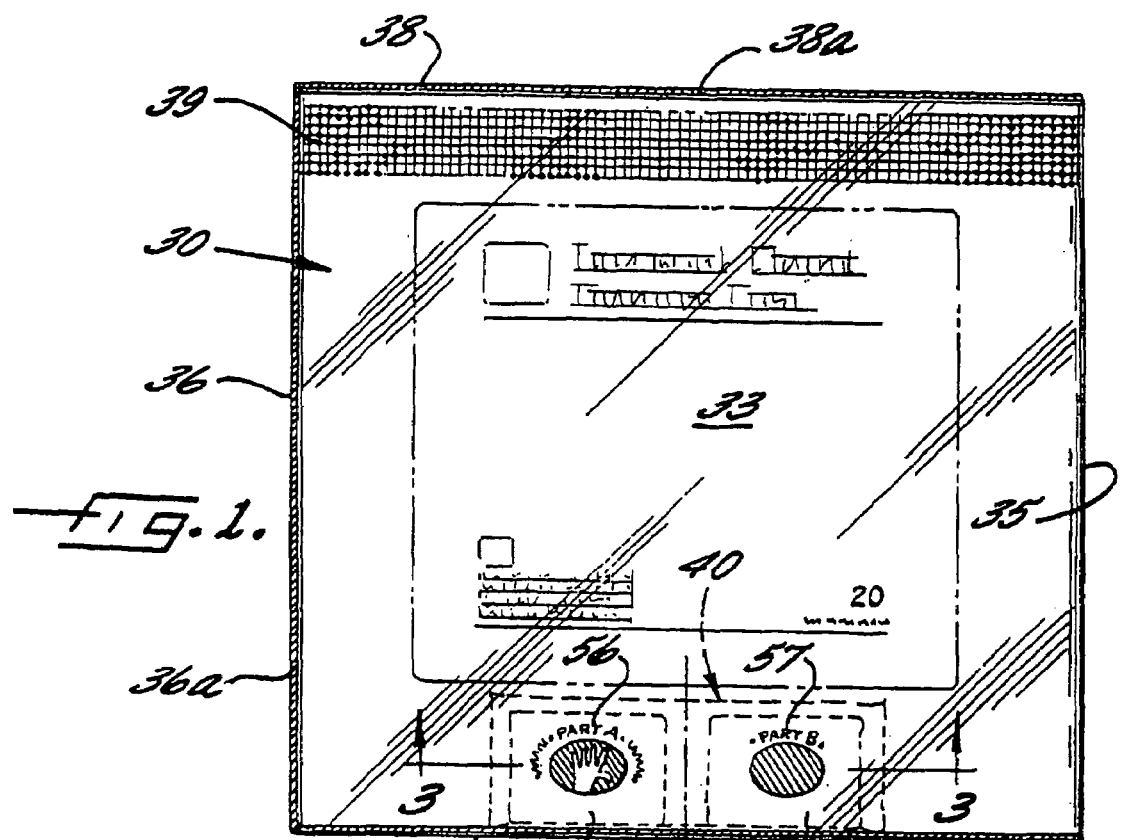
FIG. 1 is a plan view of a foam-in-bag packaging system in accordance with the present invention.

Referring now more specifically to the drawings and particularly to FIG. 1, there is illustrated therein a foam-in-bag packaging system generally indicated at 30, incorporating the features of the present invention. The packaging system 30 includes a bag, generally indicated at 31, which includes a pair of superposed panels 32 and 33. Panels 32 and 33 are formed of flexible plastic film material, such as that described in U.S. Pat. No. 5,699,902 issued Dec. 23, 1997, which is incorporated fully herein by reference. Panels 32 and 33 are preferably elongate and have sides 35, 36 and ends 37, 38 joined together to define an enclosed space 34 therewithin. It is to be understood that panels 32 and 33 may be formed from separate sheets of plastic film material or, as illustrated, from a single sheet or web of plastic film material folded along its longitudinal center line to form the joined side edge 35. The other side edge 36 and the end edges 37 and 38 are joined together by heat seals 36a, 37a and 38a to enclose completely the space 34 between the panels 32 and 33. The enclosed space 34 is vented to the outside of the bag 31 by a band 39 of perforations through at least one of the panels 32 and 33.

A packet or pouch 40 is positioned within the space 34 between the panels 32 and 33 prior to the joinder of the side and end edges 36 and 37, 38. Preferably packet 40 is positioned adjacent one end of the bag 31, but it is to be understood that the packet 40 may be located at any desired location within the enclosed space 34. Most preferably, packet 40 is positioned at the opposite end of bag 31 from the band 39 of venting perforations and is secured in this position in a suitable manner, such as by an adhesive.

Packet 40 includes a pair of panels 41 and 42 of a barrier material capable of maintaining foam precursor compositions in a stable, unreacted state for as long as required between manufacture thereof and use of the foam-in-bag packaging system 30. This barrier material preferably is a composite material which includes a heat sealable layer on the inside surface of the barrier material when the barrier material is formed into the packet 40 and other layers of material necessary to provide the requisite moisture imperviousness and other barrier characteristics. Such a composite material is described in U.S. Pat. No. 5,699,902 which has been incorporated herein by reference.

The panels 41 and 42 may be formed from separate sheets of barrier material or may be formed by a single sheet of barrier material that is folded longitudinally along the center line thereof as described above. Prior to formation of the panels 41 and 42 into the packet 40, certain areas of panel 41 are printed with a release or masking material or ink to prevent areas covered thereby from being heat sealed to panel 42. In this embodiment, a first printed area 43 extends transversely of the width of panel 41 from a point near the longitudinal fold line toward the outer side edge thereof, a predetermined distance less than the full width of panel 41. A second printed area 44 extends longitudinally of panel 41 from a point spaced from the right end (FIG. 5) toward the left end, a predetermined distance which may extend to the printed area 43. The printed areas 43 and 44 comprise discontinuous printed patterns with spaced apart printed areas 43a and 44a leaving unprinted areas 43b and 44b therebetween. Since printed areas 43a and 44a serve as masking for the underlying heat sealable layer and prevent the panels 41 and 42 from being heat sealed together wherever a printed area 43a or 44a occurs, only unprinted areas 43b and 44b may be heat sealed to panel 42, thereby forming frangible seals.

It is important that the second printed area 44 of the resist pattern extend completely to the side edge of the panel 41 of barrier material, as any region of the panel not covered by the printed pattern 44 along that edge tends to form a seal along the edge that is difficult to rupture. Accordingly, it is advantageous to form the panel 41 slightly wider than its finished size and to extend the resist pattern 44 into a marginal edge region which is subsequently cut off along a cut line that goes through the resist pattern 44, thus assuring that there is no strip of uncovered sheet material at the edge in the region of the resist pattern 44.

The resist material printed on printed areas 43 and 44 may be of a material having an acrylic/styrene resin-based vehicle, and other components such as surfactants, alcohols, defoamers and waxes which may be added to the vehicle to improve adhesion, wetting out, and other properties of the resist for ensuring accurate application of the resist patterns to the inner surface of panel 41. A pigment may be added to the vehicle to facilitate visual inspection of the resist pattern. Also, solvent based inks, such as nitro-cellulose, polyamide type inks, may be used. The resist material is also referred to herein as an ink, although the invention is not limited to ink for the resist material.

The resist material may be applied by various techniques. In a preferred method in accordance with the invention, the resist material is printed onto the inner surface of the panel 41 in a rotary printing press, such as a flexographic, rotogravure or rotary letterbox press. For example, FIG. 14 schematically depicts a printing apparatus 100 for printing resist onto a roll of material for forming the panels 41 and 42. The apparatus 100 includes an ink fountain 101, a fountain roll 102 which picks up ink from the ink fountain 101, an engraved transfer roll 103 (also known as an Anilox roll) which transfers ink from the fountain roll to a plate cylinder 104. The plate cylinder 104 has a flexible plate 105 wrapped therreabout, the plate 105 having raised areas 106 to which ink is adhered. The web of sheet material is passed through the nip defined between the plate cylinder 104 and an impression cylinder 108 which applies pressure to the web to permit transfer of ink from the raised areas onto the surface of the web.

Formation of the packet 40 may be performed on a packaging machine which manipulates the elongated printed web 120 by c-folding the web and heat sealing the web to form the permanent and frangible seals. However, the invention is not limited to any particular technique for forming the packet 40 and those skilled in the art will readily comprehend other suitable techniques for forming packets 40 in accordance with the present invention.

The panels 41 and 42 are folded along the longitudinal center line of the sheet of barrier material to position panels 41 and 42 in juxtaposed relation. The side and end edges of the panels 41 and 42 are joined to provide an enclosed space between panels 41 and 42. One side edge is joined by the fold 45. The opposite side edges of panels 41 and 42 are heat sealed together by a heat seal 46 and the ends are similarly heat sealed together by heat seals 47 and 48. A heat seal 49 extends transversely across the panels 41 and 42 intermediate the printed area 43 such that heat seal 49 includes a frangible seal 49a within the printed area 43. Seal 49 divides the enclosed space between panels 41 and 42 into first and second compartments 50 and 51. Compartment 50 is filled with a first foam precursor component 52 and compartment 51 is filled with a second foam precursor component 53. Preferably, the first foam precursor component 52 is an isocyanate containing component and the second foam precursor component 53 is a polyal containing component. The heat seal 46 extends along the length of printed area 44 and, in that area, provides a second frangible seal 46a between the second compartment 51 and the enclosed space 34 in bag 31. To ensure that the frangible seals 49a and 46a are sufficiently frangible, that the same can be broken as needed and break evenly and smoothly, it is preferred that the transverse frangible seal 49a should have a peel strength of about 0.5 to about 3.5 pounds per inch and that frangible seal 46a have a peel strength of 6–7 pounds per inch or less. The peel strength is determined by a peel test performed on an Instron machine. This peel test essentially comprises pulling apart two sealed sheets in opposite directions at 90° to the plane of the peeled sheets and measuring the force required to peel the sheets apart per inch of sheet width measured along the line along which the sheets separate. By way of comparison, the heat seals 46, 47, 48 and 49 in areas other than the printed areas 43 and 44 have a peel strength of about 12 to about 20 pounds per inch.

Figure 2:
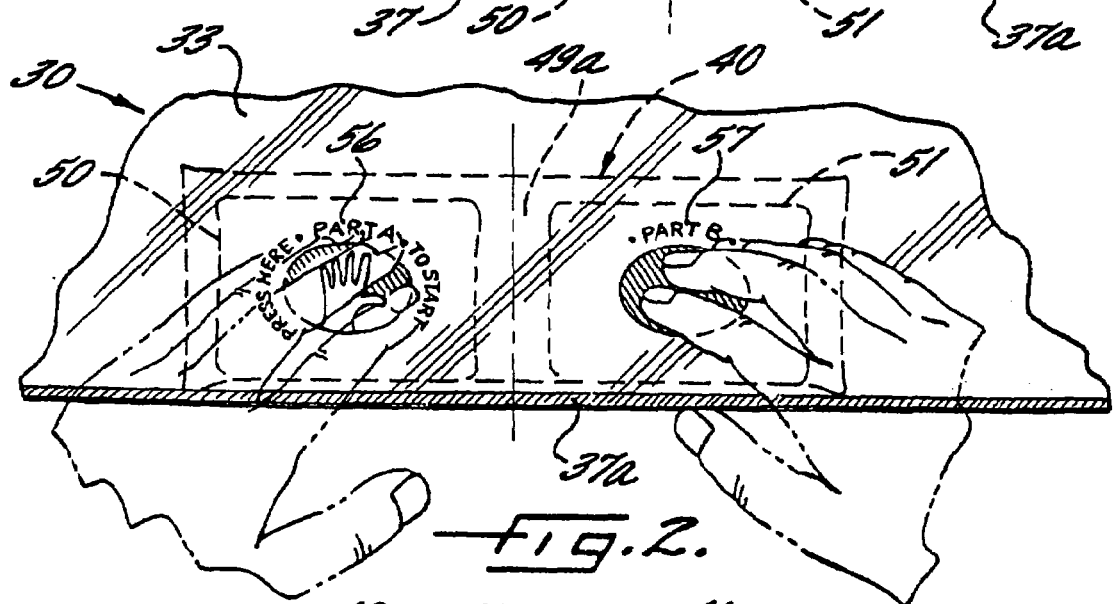
FIG. 2 is a fragmentary enlarged plan view of the bag shown in FIG. 1 illustrating the manner of fracturing or rupturing the interior frangible seal and mixing of the foam precursor components within the packet.
Figure 3:
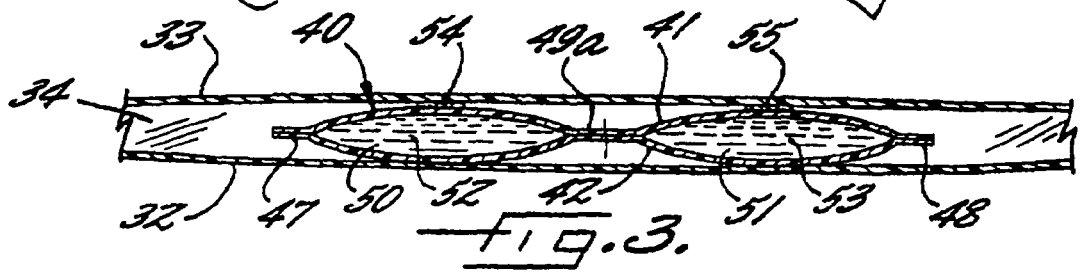
FIG. 3 is an enlarged fragmentary sectional view taken substantially along line 3—3 in FIG. 1.
Figure 4:
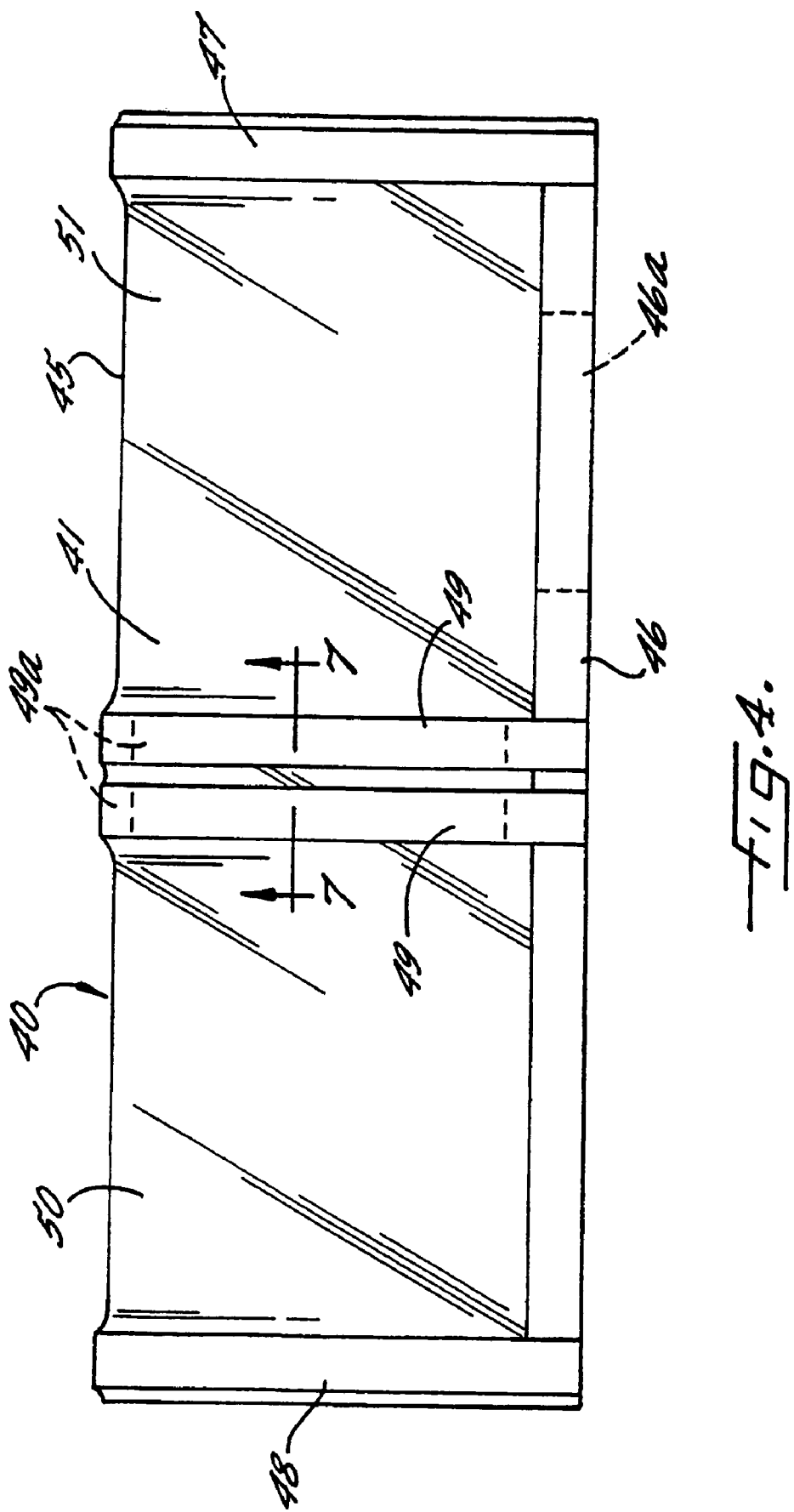
FIG. 4 is a plan view of a packet in accordance with one preferred embodiment of the present invention having an inner frangible seal between two compartments and an outer frangible seal for releasing the foam precursors from the packet.

A peel strength of the level preferred for the frangible seal 49a is suitable for allowing rupturing of the inner frangible seal 49a when relatively moderate compression is applied to either of the compartments 50 or 51. Upon rupture of the frangible seal 49a, the foam precursor components in the compartments 50 and 51 can mix since the rupture of the frangible seal 49a transforms the separate compartments into a single joined compartment. Thorough mixing of the two precursor components may be accomplished by kneading the packet 40 in alternation to cause a back and forth flow of the combined components within the packet, as is illustrated in FIG. 2. The outer frangible seal 46a is for dispensing or releasing the mixed components from the packet 40 into the enclosed space 34 of bag 31 upon the commencement of a foaming reaction. The outer seal 46a advantageously has a peel strength which is greater than that of the inner frangible seal 49a, but less than that of the permanent seals along the edges and ends of the packet 40. Thus, the compression of the components in one of the compartments to rupture the inner frangible seal 49a does not rupture the outer frangible seal 46a so that the components are confined within the packet 40 until foaming reaction commences.

The inner and outer frangible seals 49a and 46a may be formed in any suitable manner which provides the desired degree of peel strength. However, it has been found particularly advantageous to construct these frangible seals in the manner to be described below so as to ensure that uniform seals strengths are obtained, and repeatable and controlled rupturings of the seal are achieved.

To these ends, a frangible seal in accordance with this invention is formed by sealing together the opposed panels 41 and 42 of the packet 40 with a seal pattern which leaves a majority of the panels' surface areas unsealed in the region of the frangible seals 49a or 46a, and wherein the sealed areas define a pattern having certain characteristics.

The seal pattern may be formed by various techniques. For example, where the patterns are heat sealable to each other, the seal pattern may be produced by configuring the heat sealing dyes or jaws with the desired pattern. However, it has been found advantageous to form the frangible seal pattern by applying the resist material to the inner heat sealable surface of one of the opposing panels, which are to be joined to form the seal. The resist material is applied in a reverse or negative image of the desired seal pattern. The resist material prevents heat sealing of the panels 41 and 42, and accordingly the desired seal pattern is obtained by applying pressure and heat to the panels in a region of the resist material, which causes the panels to be sealed together wherever resist material is absent.

Figure 5:
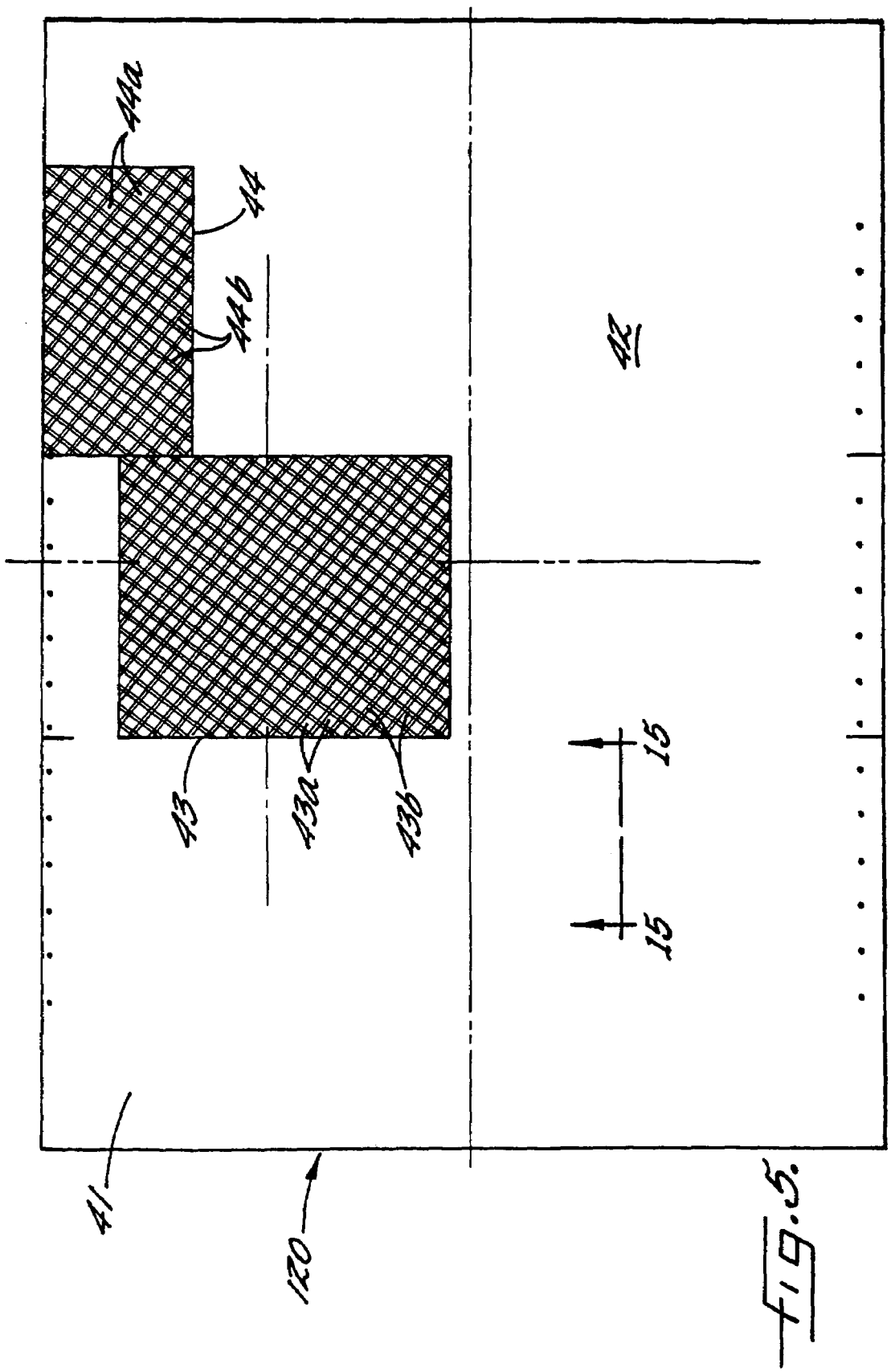
FIG. 5 is a plan view of a sheet of flexible barrier material from which the packet illustrated in FIGS. 1–4 is formed and illustrating the inner surface having two areas of resist material applied for formation of the two frangible seals.

The resist patterns 43 and 44 are configured, in the embodiment of the invention depicted in FIG. 5, as squares 43a and 44a arranged in a checkerboard fashion, such that the regions of the panel 41 not covered by the resist material, form an orthogonal grid of intersecting lines 43b and 44b. It will be appreciated that the resultant seal pattern formed by heat sealing the opposing panels 41 and 42 along the region of the resist pattern 43 will comprise seal lines forming an orthogonal grid of intersecting lines substantially identical to the lines 43b. Thus, the resist pattern 43 is a reverse or negative image of the desired sealed pattern, and accordingly, the lines 43b are referred to herein as seal lines.

Figure 6:
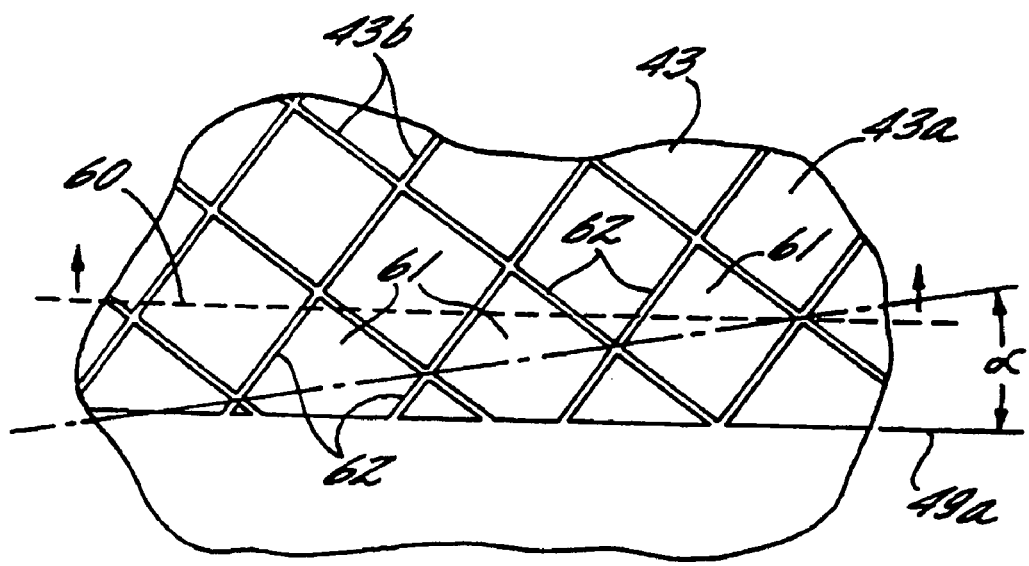
FIG. 6 is an enlarged fragmentary view of a portion of the seal pattern for the inner frangible seal as illustrated in FIG. 5.

The seal pattern is configured to facilitate a uniform and controlled peeling apart of the opposing panels 41 and 42 of the packet 40 when one of the compartments 50 or 51 is compressed to cause rupturing of the inner frangible seal 49*a*. This is achieved by arranging the seal pattern such that a linear front of fluid, represented by the line 60 in FIG. 6, which is advancing from compartment 51 toward compartment 50 along a direction generally perpendicular to the inner frangible seal 49*a* and encounters at least one converging pocket 61 (FIG. 6) defined by a segment of seal lines 43*b* which are at oblique angles to the advancing fluid front along the line 60. Preferably, there are a plurality of converging pockets 61 spaced apart along the seal line between the opposite ends of the frangible seal 49*a*, as is shown in FIG. 6. The converging pockets 61 facilitate peeling apart of the opposing panels 41 and 42 of the packet 40 by fluid pressure acting within the pockets 61, which causes the panels 41 and 42 to be peeled apart along the directions of the oblique converging seal lines of the pockets 61, such as seal lines 62 (FIG. 6).

The seal lines 43*b* advantageously have a width of about 0.002 inch to about 0.01 inch, and more preferably about 0.002 inch to about 0.006 inch. The grid patterns 43 and 44 may be tailored to achieve desired seal strength. For instance, to facilitate making the outer frangible seal 46*a* stronger than the inner frangible seal 49*a*, the seal lines in the inner resist pattern 43 preferably are 0.003 inch wide and the seal lines 44*b* in the outer pattern 44 are 0.004 to 0.005 inch wide. Further, the grid in the inner resist pattern 43 may have a different grid size or spacing between seal lines than that of the outer resist pattern 44. The inner and outer resist patterns 43 and 44 advantageously have a grid spacing of about 0.08 inch to about 0.11 inch.

It has been found that if the points of intersection of the orthogonal seal lines 43*b* and 44*b* are aligned along the direction of the fluid front, rupturing of the frangible seal 49*a* and 46*a* is not uniform and tends to occur in a irregular or jerky fashion as the aligned inner section points all tend to become unsealed at about the same moment, and this repeats for each row of aligned intersection points. It has further been discovered that this non-uniform or irregular opening is alleviated appreciably by orienting the grid such that the intersection points define an oblique line at an angle α with respect to the fluid front direction represented by line 60. The angle α is preferably about 5° to about 9° and more preferably about 7°.

Figure 7:
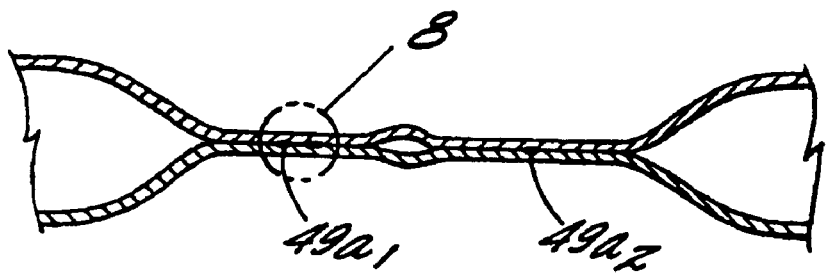
FIG. 7 is a cross-sectional view taken substantially along line 7—7 of FIG. 4.
Figure 8:
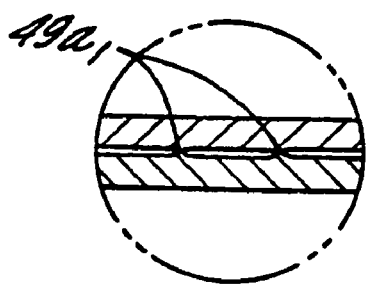
FIG. 8 is an enlarged fragmentary view of a portion of the inner frangible seal shown in FIG. 7.
Figure 9:
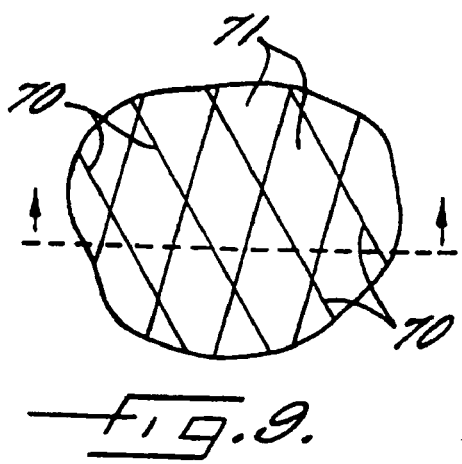
FIG. 9 is a fragmentary schematic view illustrating an alternate seal pattern for forming the frangible seals of the packet of the present invention.

As is illustrated in FIGS. 7 and 8, the inner frangible seal 49*a* of the packet 40 preferably comprises two discreet seals 49*a*$_1$ and 49*a*$_2$ separated by an unsealed region therebetween. This facilitates forming the packet 40 on a packaging machine in which two heat sealing bars are used alternately to form the two seals 49*a*$_1$ and 49*a*$_2$ of two contiguous packets, following which completed packets are separated from the advancing web of sheet material by cutting along a cut line between the transverse edge seal 48 of one packet and seal 47 of the contiguous packet. However, the space between seals 49*a*$_1$ and 49*a*$_2$ has the further advantage of permitting a packaging line operator to determine whether any of the package components are being deposited on the inner surface of the panels 41 and 42 in the region of the inner frangible seal 49*a*, which can impair proper sealing of the panels to each other. This is accomplished by cutting a completed package along the unsealed region between the two frangible seals 49*a*$_1$ and 49*a*$_2$ to check for fluid present therein.

As can be seen in FIG. 8, the opposing panels 41 and 42 are sealed to each other only in the regions which do not have resist material applied to panel 41. Thus, fluid can flow through the spaces between the sealed regions in order to fill the converging pockets 61 as previously described.

FIGS. 9 through 12 show various alternative seal patterns in accordance with the present invention. In these figures, the patterns are not shown in reverse or negative image, but rather the lines represent the seal lines between the opposing panels 41 and 42 of the packet 40. The seal pattern need not be an orthogonal grid as shown in FIGS. 5 and 6, and various non-orthogonal grids may be used, such as the one shown in FIG. 6 in which intersecting continuous lines 70 form a diamond-shaped grid with converging pockets 71.

Figure 10:
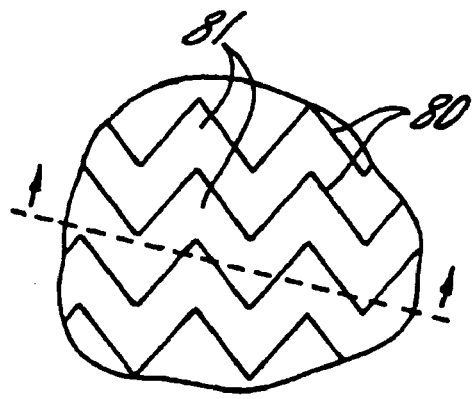
FIG. 10 is a fragmentary schematic view depicting another alternative seal pattern for forming the frangible seals of the packet of this invention.
Figure 11:
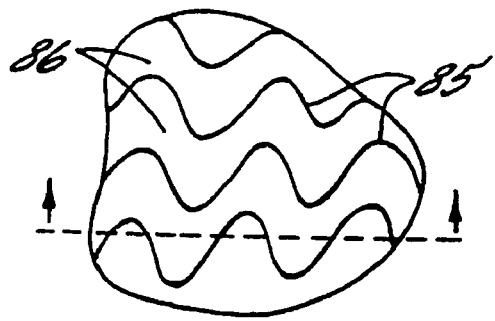
FIG. 11 is a fragmentary schematic view depicting yet another alternative seal pattern for forming the frangible seals.

Furthermore, the seal pattern need not be an intersecting or grid pattern. For example, FIGS. 10 and 11 depict two alternative seal patterns in which continuous lines 80 and 85 extend throughout the frangible seals 49*a* and 46*a*. As shown in FIG. 10, the seal pattern is a running W or saw tooth pattern, and as depicted in FIG. 11, the seal pattern is a wavy or sine-wave type pattern. The lines 80 define converging pockets 81 and the lines 85 define converging pockets 86.

Figure 12:
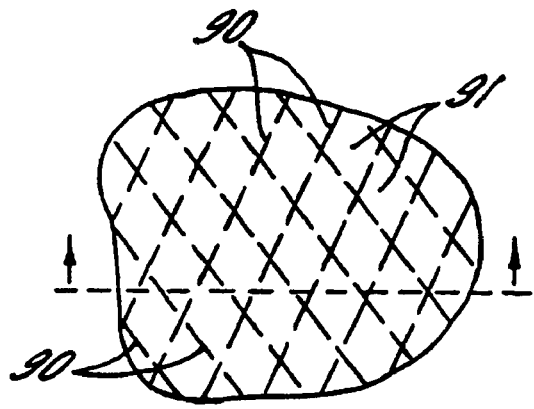
FIG. 12 is a fragmentary schematic view depicting a still further alternative seal pattern for forming the frangible seals of the packet of this invention.

The seal lines forming the seal pattern need not be completely continuous throughout the frangible seals 49*a* and 46*a*. For example, FIG. 12 depicts a diamond grid pattern made up of lines 90 which have discontinuities or gaps 91 therein. The gaps 91 are sufficiently narrow such that the fluid is prevented from migrating through the seal.

Figure 13:
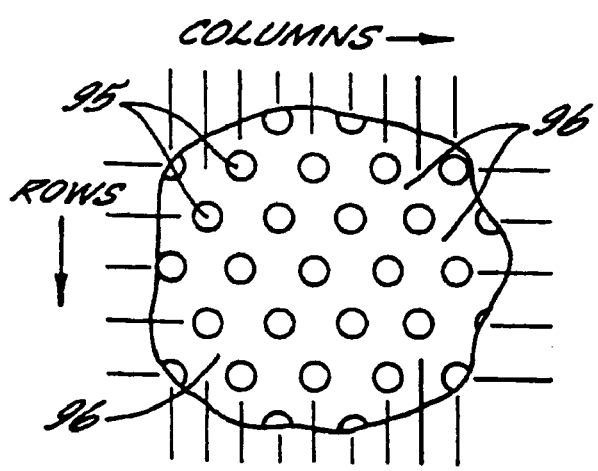
FIG. 13 is a fragmentary schematic view depicting a half-tone seal pattern for forming the frangible seals of the present invention.

The seal pattern need not be composed of lines or line segments. For example, FIG. 13 depicts a seal pattern in which discreet sealed regions 95 are spaced apart and surrounded by unsealed areas 96 and are arranged in a matrix configuration. The matrix is shown as having a substantially regular or uniform spacing of the matrix rows and columns but non-uniform matrixes may be used if desired; for example, for providing relatively weaker and stronger regions of a given seal.

Where the seal pattern of FIG. 13 is accomplished by applying resist material to the panel 41 or 42 in a reverse image of the pattern of FIG. 13, as described above, the resist material advantageously is applied by a half-tone printing process. Half tones are conventionally described in terms of half-tone density in lines per inch, each line representing a row or column of the matrix and in terms of percent coverage of the material being applied to the sheet. The frangible seals 49*a* and 46*a* may be formed advantageously by printing resist material in a half-tone matrix having a line density of at least about 15 lines per inch, more preferably at least about 50 lines per inch, with a coverage of at least about 60 percent and more preferably at least about 80 percent.

As stated earlier, where foam precursor components are to be contained in packet 40, it has been found preferable to use a laminant sheet, as generally indicated at 120, as is shown in FIG. 15. The laminant sheet 120 is formed of five layers. A layer 122 which forms the exterior surface of the packet 40 is formed of an oriented polyethyleneteraphthalate (PET), such as MYLAR. A polyethylene tie layer 124 is joined to the PET layer 122, and a metal foil layer 126 is joined to the tie layer 124. A layer 128 of ethylene acrylic acid is joined to the inner side of the foil layer 126, and a linear low density polyethylene (LLDPE) layer 130 is joined to the layer 128 and forms the inner surface of the packet 40.

The inner layer 130 may also be formed of low density polyethylene (LDPE), other types of polyethylene, and other non-polar polymer materials, or other heat sealable materials. In printing inks onto non-polymer materials, it is conventional to treat the surface by way of corona discharge or flame treatment in order to modify chemically the surface to increase the surface energy (measured in dynes) so that the inks adhere more readily to the surface. However, in accordance with the present invention, the resist material is applied to the inner surface of non-polar polymer material which is in a substantially virgin state, i.e., substantially unmodified by any corona discharge, flame or other treatment. It has been found that such modifying treatments impair the heat-sealability of the surface, leading to lower-strength permanent seals. Accordingly, the entire inner surfaces of the sheet or sheets forming the packet 40 comprise substantially virgin non-polar polymer material.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A packaging system for producing a foam-in-bag cushion upon demand comprising a bag formed of flexible plastic film material and defining therein an enclosed space of a volume corresponding to the size of the foam cushion to be produced, said enclosed space being vented to the outside of said bag to permit the escape of gases generated during the formation of the foam cushion while preventing the escape of foam therefrom, a foam precursor packet positioned at a predetermined location within said enclosed space in said bag and being formed of a barrier material capable of maintaining foam precursor components in a relatively stable and unreacted state, said packet including a first compartment and a second compartment with a first frangible seal separating said first and second compartments and adapted to be ruptured when it is desired to form the foam cushion, said packet also including a second frangible seal between one of said compartments and said enclosed space in said bag, a first foam precursor component contained in said first compartment of said packet, a second foam precursor component contained in said second compartment of said packet, said first and second foam precursor components being adapted to be mixed upon rupture of said first frangible seal and to react to form foam which will rupture said second frangible seal and expand from said packet into said enclosed space in said bag until said enclosed space is substantially filled with foam and said foam cushion is formed, and said frangible seals having a peel strength of at least about one-half pound per inch and less than about twelve pounds per inch.

2. A packaging system according to claim 1, including means for securing said packet in said bag at said predetermined location.

* * * * *